United States Patent [19]

Cristiani et al.

[11] 4,270,670

[45] Jun. 2, 1981

[54] DEVICE FOR THE HIGH SPEED FEEDING OF ROD-LIKE ARTICLES

[75] Inventors: Athos Cristiani, Bologna; Gianluigi Gherardi, Medicina, both of Italy

[73] Assignee: CIR S.p.A. Divisione Sasib, Bologna, Italy

[21] Appl. No.: 24,079

[22] Filed: Mar. 26, 1979

[30] Foreign Application Priority Data

Mar. 29, 1978 [IT] Italy ............................ 12534 A/78
Apr. 28, 1978 [IT] Italy ............................ 12584 A/78

[51] Int. Cl.³ ............................................ B65H 3/12
[52] U.S. Cl. ................................ 221/211; 198/557; 198/689; 221/237
[58] Field of Search ............... 221/211, 201, 236, 237, 221/266; 198/689, 550, 557

[56] References Cited

U.S. PATENT DOCUMENTS

| 1,000,347 | 8/1911 | Schmidt | 221/236 |
| 2,979,228 | 4/1961 | Englert | 221/211 X |
| 3,127,975 | 4/1964 | Lemmond | 198/689 X |
| 3,206,062 | 9/1965 | Rappaport | 221/211 X |
| 3,237,753 | 3/1966 | Allen et al. | 221/211 X |
| 3,503,488 | 3/1970 | Stone | 198/454 |
| 3,513,962 | 5/1970 | Stone et al. | 198/557 X |
| 3,715,056 | 2/1973 | Preston | 221/211 |
| 3,876,063 | 4/1975 | Saarima | 221/201 X |
| 3,983,987 | 10/1976 | Lynch | 198/689 X |
| 3,985,252 | 10/1976 | Hinchcliffe et al. | 198/689 X |
| 4,063,633 | 12/1977 | Hall | 198/455 |

FOREIGN PATENT DOCUMENTS 1489983 10/1977 United Kingdom .

*Primary Examiner*—F. J. Bartuska
*Attorney, Agent, or Firm*—Spencer & Kaye

[57] ABSTRACT

The device for the high speed feeding of cigarette filter rods from a magazine, through a vertical chute, to a rotary pick-up drum arranged at the bottom end of the vertical chute, comprises an endless suction belt which defines one side wall of the vertical chute and an adjoining portion of the bottom wall of the magazine. In this manner, the filter rods are positively pushed downwardly through the chute.

4 Claims, 7 Drawing Figures

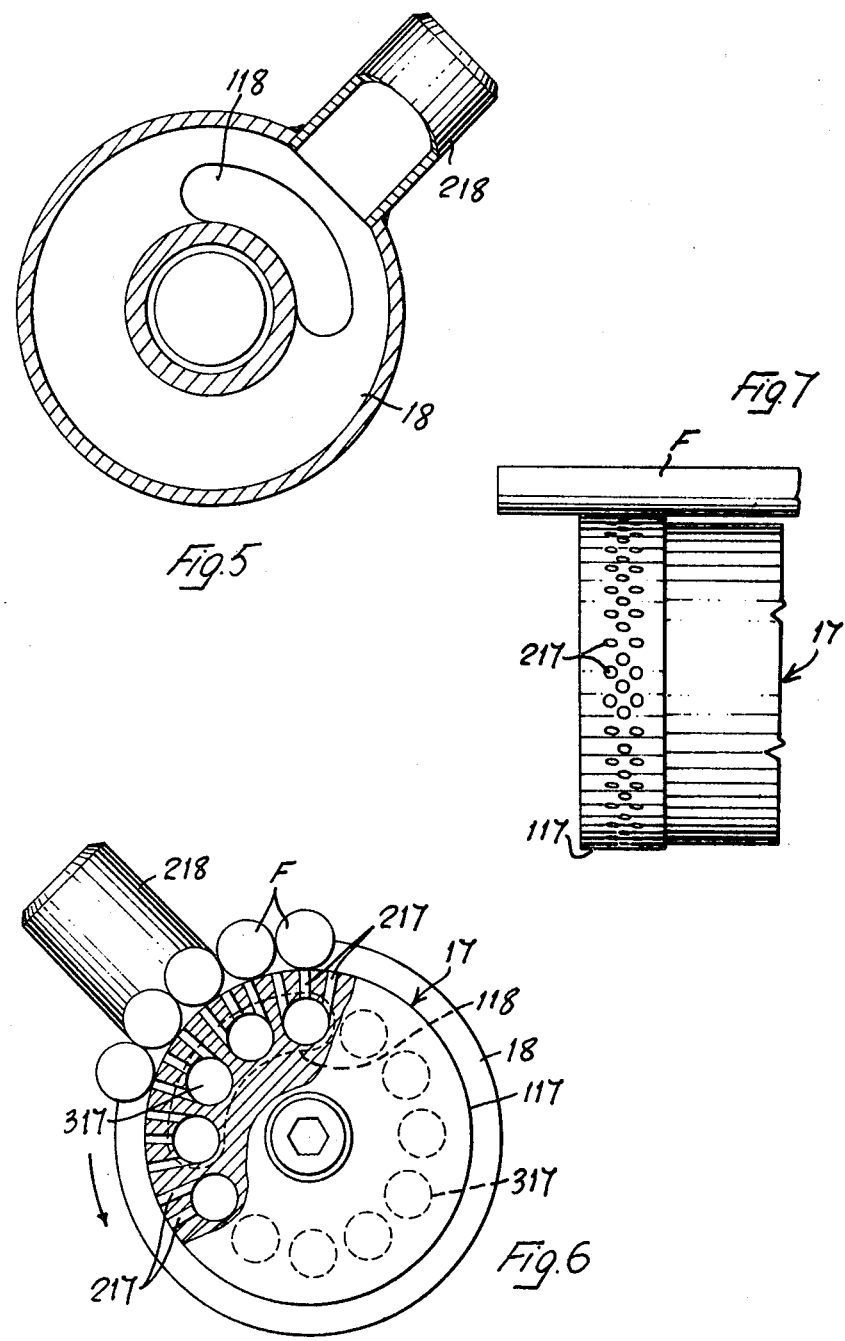

DEVICE FOR THE HIGH SPEED FEEDING OF ROD-LIKE ARTICLES

STATEMENT OF PRIOR ART

In accordance with 37 CFR 1.56 and 37 CFR 1.97, applicants submit herewith copies of the following prior art:
(1) U.S. Pat. No. 4,063,633 (HALL): the whole document is of interest.
(2) U.S. Pat. No. 3,985,252 (HINCHCLIFFE): the whole document is of interest.
(3) U.S. Pat. No. 3,876,063 (SAARIMA): FIG. 3.
(4) U.S. Pat. No. 3,503,488 (STONE): the whole document is of interest.
(5) U.K. Pat. No. 1,489,983 (HAUNI): FIG. 2.

This art is the closest prior art known to applicants.

BACKGROUND AND SUMMARY OF THE INVENTION

The present invention relates to a device for the high speed feeding of rod-like articles, such as for example cigarette filter rods, from a magazine in which there is contained a bulk supply of said articles to a subsequent processing machine, such as can be for example a cigarette making machine.

The known feeding devices usually comprise a magazine presenting downwardly inclined and converging bottom walls, forming a throat from which a single row of articles (filter rods) enters a substantially vertical (or anyhow slightly inclined) chute. In correspondence with the bottom end of the said chute there is arranged a pick-up device, usually in the form of a rotating drum presenting pick-up teeth, which picks the filter rods sequentially the one after the other as they come out of the bottom end of said chute, and conveys them for example to a transferring drum for subsequent handling operations.

In order to improve the speed characteristics of the said devices, there are known feeding devices in which at least one of the bottom walls of the magazine is subjected to vibratory movement, so as to favour the introduction of the filter rods into the throat zone and in the descending chute. According to other known type devices, one of the said bottom walls of the magazine is constructed as an endless belt which continuously moves the filter rods in a row towards the inlet or upper end of the said chute. The above devices however, present the inconvenience that the filter rod descend along the chute due to the gravity force, and therefore their speed along this chute is necessarily limited, which does not permit to drive the pick-up device arranged at the bottom or outlet end of the chute at higher operational speeds which could be attained by the cigarette maker operatively connected to the feeding device.

In order to increase the speed of the filter rods along the downwardly directed chute, it has been proposed, by the U.S. Pat. No. 4,063,633 (HALL), to provide suction means in correspondence with the bottom end of the chute, so as to draw downwardly at least the lowermost filter rod along the chute, due to the combined action of gravity and of the suction, at a resulting rate of acceleration faster than gravity. This device however present the inconvenience that, although the speed of the lowermost filter rods is remarkably increased, there cannot be ensured a constant and predetermined feeding flow of the rods to the outlet end of the chute, in correlation with the demand of the pick-up device. In fact, in the upper section of the chute the feeding speed depends on gravity (with the consequent limitations), while in the lower section of the chute there takes place an acceleration of the speed of the lowermost rods, which does not determine necessarily an increased outflow of rods from the outlet end of the chute, in the same time interval.

In consideration of the above, the present invention provides for a device for the high speed feeding of rod-like articles, such as cigarette filter rods, from a magazine, through a substantially vertical chute, to a pick-up device arranged in correspondence with the outlet or bottom end of the chute, in which the improvement resides in the fact that there are provided forced-feeding means for positively feeding the filter rods from the bottom of the magazine through the inlet end of the chute, so that the filter rods are practically pushed downwardly through the said chute at a predetermined constant speed.

According to a first embodiment of the invention, the said forced-feeding means consist of at least one endless suction belt which defines a side wall of the vertical chute and at least an adjoining portion of the bottom wall of the magazine.

According to another preferred embodiment, the forced-feeding means consist of a suction roller driven at a suitable speed and arranged in correspondence of the inlet or upper end of the vertical chute.

The above and other features of the invention and the advantages deriving therefrom will appear evident from the following detailed description of two preferred embodiments of same, made with reference to the attached drawings.

BRIEF DESCRIPTION OF THE DRAWINGS

FIG. 5 is a transverse section along line V—V of FIG. 4.

FIG. 6 is a front view, with parts in section, along line VI—VI of FIG. 4.

FIG. 7 is a view showing a detail of the suction roller of the feeding device according to FIG. 3.

DESCRIPTION OF A PREFERRED EMBODIMENT

Figure 1:
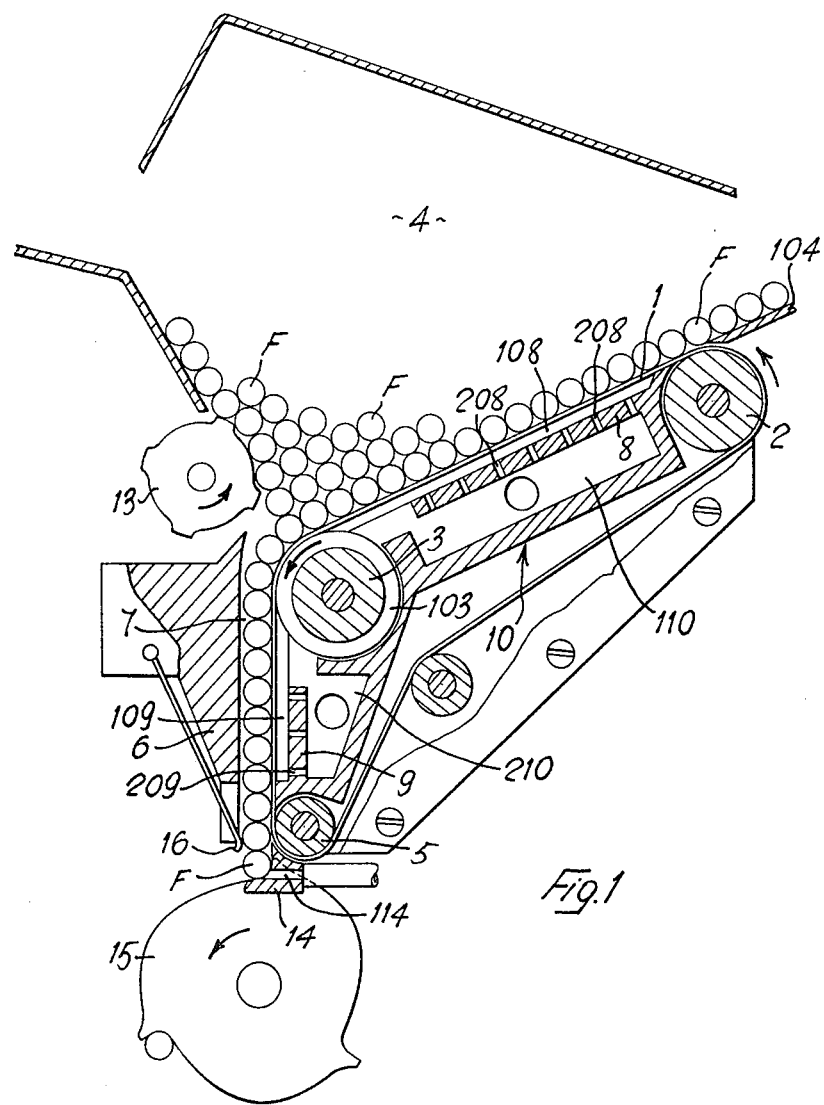
FIG. 1 is a side elevation sectioned view of a feeding device according to the invention.
Figure 2:
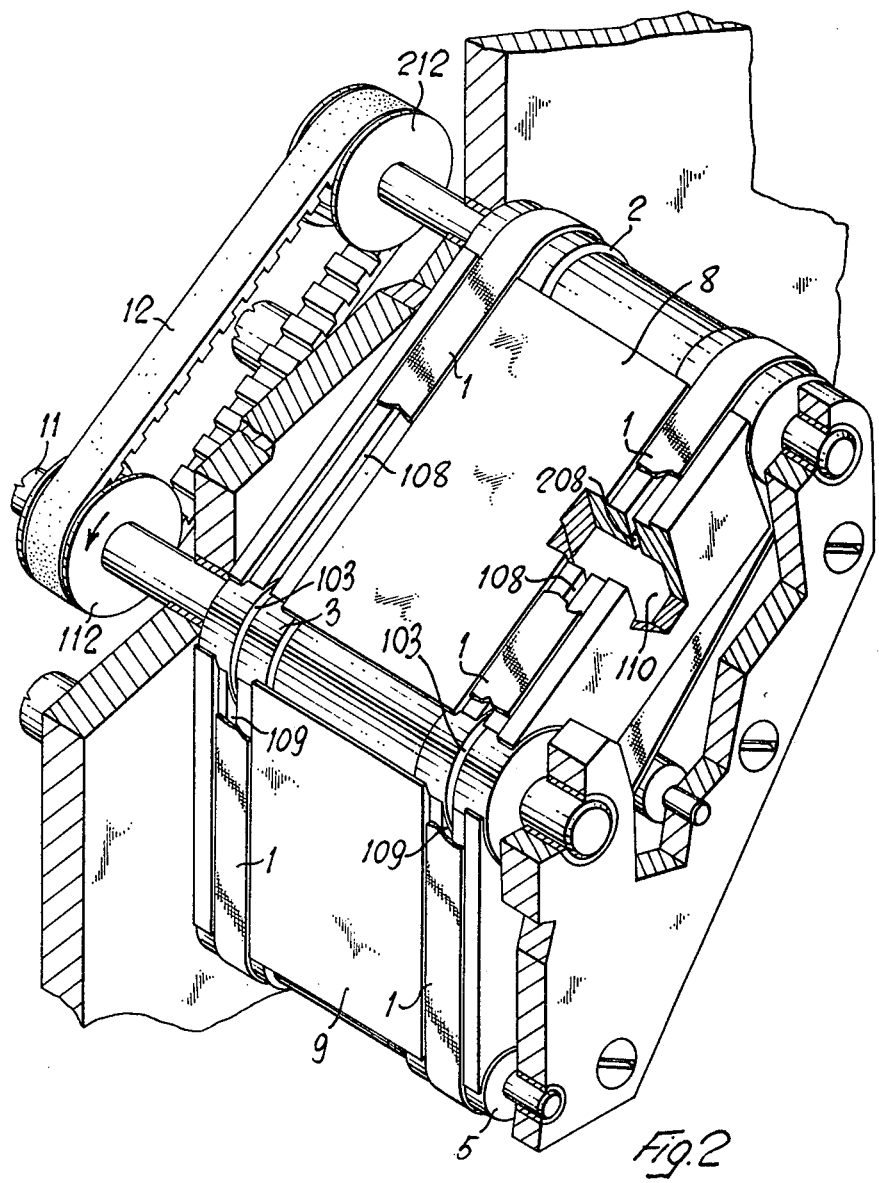
FIG. 2 is a perspective view, with parts broken away, of part of the device shown in FIG. 1.
Figure 3:
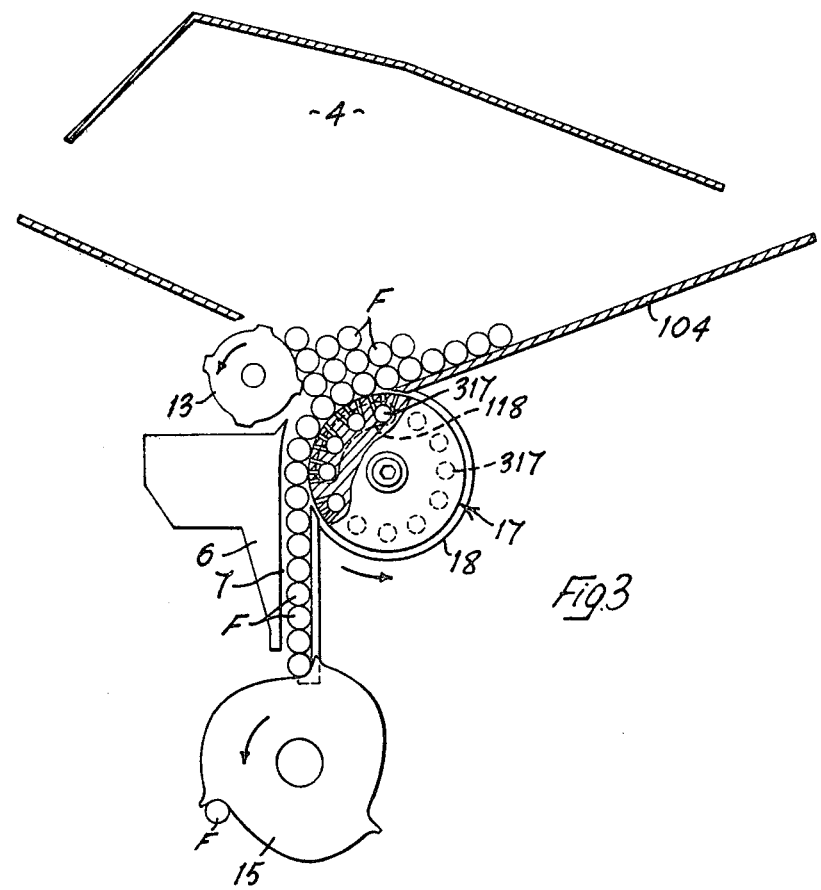
FIG. 3 is a side elevation sectioned view of another embodiment of the feeding device.

With reference to FIGS. 1 and 2 of the drawings, the device for the high speed feeding of rod-like articles, such as cigarette filter rods, includes a magazine 4 containing a supply of filter rods F. The magazine 4 presents, in correspondence of its bottom, two inclined walls which converge so as to form a bottom throat through which the rods F will pass, in a single row, into a vertical chute 7. More particularly, one wall 104 terminates at a certain distance from the said throat and presents as its prolongation down to the inlet end of chute 7, the upper runs of a pair of endless belts 1, made of material which is very permeable to the air, such as for example loosely woven synthetic fibre fabric. The endless belts 1 are passed over rollers 2, 3 and 5, in such a manner that besides forming the said inclined prolongation of wall 104, they also define a substantially vertical portion between rollers 3 and 5, which constitutes one wall of the chute 7, the other wall of the chute being represented by the fixed guide element 6. The distance between the vertical runs of belts 1 and the fixed guide element 6 is slightly more than the diameter of a single rod F, so that in the said chute 7 the rods F will be piled singularly the one on the other.

The surfaces of the inclined bottom prolongation of the magazine wall 104, and of the vertical wall of chute 7, between the active runs of belts 1, are completed by the correspondingly inclined faces 8, respectively 9, of the suction box 10. More particularly, the belts 1 slide against the said faces 8 and 9 of suction box 10, on rectilinear grooves 108, respectively 109, which grooves communicate, through bores 208, respectively 209, with the inner cavities 110, respectively 210 of the suction box 10, which cavities are connected to a source of suction. Roller 3 presents, in correspondence of the endless belts 1, the circumferential grooves 103 which communicate with both cavities 110 and 210.

The driving shaft 11, onto which the roller 3 is mounted freely rotatable, transmits the drive to the driving roller 2 by means of the pulley and belt transmission 12, 112, 212.

Opposite to the pair of belts 1, in correspondence of the inlet or upper end of the chute 7 there is arranged a singularizing roller 13, of known type, which rotates in a direction opposed to the direction of rotation of roller 3, and which serves to prevent clogging of the throat section by the filter rods F.

In correspondence of the outlet or lower end of chute 7 there is provided a pair of abutment members or feet 14, which are connected, through channel 114, to a source of suction, and which serve for stopping the filters F as they reach the bottom of the said chute 7. Above the said feet 14 there are provided laminar springs 16, which elastically bear inwardly at the interior of chute 7, and serve for temporarily holding the filter rod F immediately above to the one stopped by the abutment feet 14. The device is completed by a pick-up roller 15, of known type, which picks up individually the filter rods F from the abutment feet 14 at the end of chute 7, and transfers them to subsequent operational steps.

The operation of the just described feeding device is simple and evident. The filter rods F contained in the magazine 4 adhere due to suction to belts 1 and are therefore fed at a predetermined speed and with forced motion, into and along chute 7. The speed of belts 1 is calculated in such a manner that the filter rods F are fed to the bottom end of chute 7 at a speed higher than the speed at which the pick-up roller 15 takes them from the said bottom end. Clearly, this speed can be higher than the speed deriving just from gravity, and the forced displacement of the rods F along the chute 7 avoids any possible gap (absence of one or more filter rods) in the feeding of the filters to the pick-up roller 15.

DESCRIPTION OF A SECOND PREFERRED EMBODIMENT

With reference to FIGS. 3 to 7 of the drawings, there is shown a modified embodiment of the feeding device.

According to this more simplified embodiment, instead of the pair of endless belts 1 of the preceding embodiment, there is provided a single suction roller 17, which is arranged in correspondence of the inlet or upper end of chute 7. An arc portion of the circumference of this roller 17 therefore constitutes the prolongation of the side wall 104 of magazine 4, while an adjoining arc portion constitutes the initial upper portion of one of the walls defining the vertical chute 7.

The suction roller 17 presents in correspondence of its ends a pair of projecting rings 117, each ring being provided with a plurality of suction bores 217. Said suction bores 217 communicate with a crown of manifold ducts 317 which are closed at one end and open at the opposite end, which communicates with a suitable source of vacuum through the fixed distributor 18 which presents a distribution slot 118 and a connection duct 218 for connection to the vacuum source. Between the fixed distributor 18 and the drum 17 there is arranged a sealing packing 19, consisting for example of a graphite disc provided with a slot 119 in correspondence with slot 118 of the distributor 18.

Figure 4:
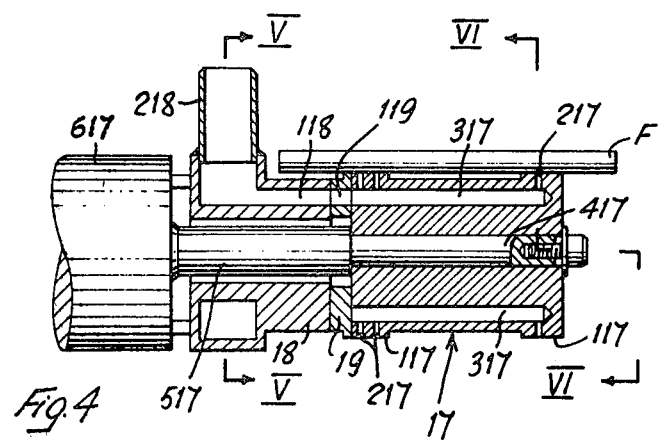
FIG. 4 is a longitudinal section of the suction roller forming part of the device shown in FIG. 3.

As it appears from FIG. 4, the suction drum 17 is mounted for rotation around the axis of shaft 417, 517, 617.

The operation of the described embodiment is substantially similar to the operation of the first embodiment, and therefore no further explanation is needed.

It is believed that the invention will have been clearly understood from the foregoing detailed description of some preferred embodiments. Changes in the details of construction may be resorted to without departing from the spirit of the invention, and it is accordingly intended that no limitation be implied and that the hereto annexed claims be given the broadest interpretation to which the employed language fairly admits.

We claim:

1. A device for the high speed feeding of rod-like articles such as cigarette filter rods from a magazine containing a bulk supply of such articles, through a chute having an upper inlet end, a lower outlet end and spaced apart walls to define a flow path for a single row of articles, to pick-up means which sequentially pick up the articles individually the one after the other in operative association with the outlet end of the said chute, wherein the improvement resides in the fact that there are provided forced-feeding means for positively feeding the said articles from the bottom of the magazine, where the said chute opens with its inlet end, through the said inlet end of the chute, said forced-feeding means comprising: an endless suction belt which defines at least an upper portion of a side wall of the chute, and at least an adjoining portion of the bottom wall of the magazine; and means driving said belt at a speed sufficient to propel articles downwardly through the chute, starting from the upper portion thereof, with an acceleration greater than that produced by the force of gravity.

2. A device according to claim 1, in which the suction belt is passed over three rollers which have their rotational axis arranged according to the vertexes of a triangle, in such a manner that a rectilinear run of the belt defines at least partially a bottom wall of the magazine, while another rectilinear run of the belt defines at least partially one wall of the chute.

3. A device according to claim 2, wherein said forced-feed means further comprises a second endless suction belt parallel and spaced from the first endless suction belt.

4. A device according to claim 2, in which at least one of the rollers onto which the suction belt is passed is a driving roller.

* * * * *